United States Patent
Wade et al.

(10) Patent No.: US 9,113,752 B2
(45) Date of Patent: Aug. 25, 2015

(54) WAND ATTACHMENTS FOR HAND-HELD ELECTRIC BLENDERS

(75) Inventors: Adam Wade, Southsea (GB); David Downie, Waterlooville (GB)

(73) Assignee: KENWOOD LIMITED, Havant, Hampshire (GB)

( * ) Notice: Subject to any disclaimer, the term of this patent is extended or adjusted under 35 U.S.C. 154(b) by 566 days.

(21) Appl. No.: 13/265,563

(22) PCT Filed: Apr. 16, 2010

(86) PCT No.: PCT/GB2010/000765
§ 371 (c)(1),
(2), (4) Date: Dec. 28, 2011

(87) PCT Pub. No.: WO2010/122285
PCT Pub. Date: Oct. 28, 2010

(65) Prior Publication Data
US 2012/0097775 A1    Apr. 26, 2012

(30) Foreign Application Priority Data

Apr. 21, 2009    (GB) .................................. 0906784.4

(51) Int. Cl.
*A47J 43/044*    (2006.01)
*A47J 43/07*    (2006.01)

(52) U.S. Cl.
CPC .... *A47J 43/0711* (2013.01); *A47J 2043/04427* (2013.01)

(58) Field of Classification Search
CPC .................. A47J 43/00; A47J 43/0711; A47J 2043/04427
USPC .......... 366/129, 130; 241/169.1, 46.11, 46.17
See application file for complete search history.

(56) References Cited

U.S. PATENT DOCUMENTS

| 3,135,500 | A | 6/1964 | Perrijnaquet |
| 8,757,287 | B2 | 6/2014 | Mak et al. |

(Continued)

FOREIGN PATENT DOCUMENTS

| CN | 2936081 | 8/2007 |
| CN | 101066194 | 11/2007 |

(Continued)

OTHER PUBLICATIONS

Written Opinion of the International Searching Authority mailed May 25, 2011 for PCT/GB2010/000765 filed Apr. 16, 2010.

(Continued)

*Primary Examiner* — Mark Rosenbaum
(74) *Attorney, Agent, or Firm* — Paul D. Bianco; Martin Fleit; Fleit Gibbons Gutman Bongini & Bianco PL

(57) ABSTRACT

A wand-like tool (20) for a hand blender comprises an elongate, tubular housing (22) containing a rotatable drive shaft (23). The tool is adapted at one end to permit the shaft (23) to pick up rotary drive from a hand-held driver unit, and carries a foodstuff-processing head at its other end; the processing head comprising a bladed member (26), coupled to the shaft (23) and having at least three blades (32a, 32b, 32c). The bladed member rotates within a processor head housing (27) having a tubular side-wall (30) formed with a roof (36) where the processor head housing (27) joins the tubular shaft housing (22) and being open at its opposite end, and the internal surface (38) of the side-wall (30) bears protrusions (40) facing the tips of the blades (32a, 32b, 32c). Each protrusion (40) presents a respective bluff body to foodstuffs flowing past it. In some embodiments of the invention, the side-wall (30) is castellated (44, 46) and the protrusions (40) are formed only in non-castellated regions of said side-wall (30). In a preferred embodiment, the shaft housing (22) is formed of metal, such as stainless steel, whereas the head housing (27) is of plastics material, thereby to permit the protrusions (40) and the castellations (44, 46) to be readily formed by moulding, and a stainless steel dome (50) is provided to overlay the roof member (36) of the plastic housing (27) and/or the junction between the stainless steel and plastic component parts (22, 27) for cosmetic reasons.

20 Claims, 5 Drawing Sheets

(56) References Cited

U.S. PATENT DOCUMENTS

2002/0034121 A1    3/2002    Rebordosa et al.
2009/0213685 A1    8/2009    Mak et al.

FOREIGN PATENT DOCUMENTS

| | | |
|---|---|---|
| CN | 101080187 | 11/2007 |
| CN | 201057953 | 5/2008 |
| CN | 101242764 | 8/2008 |
| CN | 101361638 | 2/2009 |
| DE | 1174949 B | 7/1964 |
| DE | 4321653 A1 | 1/1995 |
| EP | 0682904 A1 | 11/1995 |
| EP | 1407701 | 4/2004 |
| FR | 1229022 A | 9/1960 |
| JP | 2005058645 A | 3/2005 |
| WO | 2010012728 | 2/2010 |

OTHER PUBLICATIONS

International Search Report published May 25, 2011 for PCT/GB2010/000765 filed Apr. 16, 2010.

British Search Report mailed Aug. 13, 2009 for Application No. 0906784.4 filed Apr. 21, 2009.

First Chinese Office Action dated Nov. 26, 2013 for related Chinese Application No. 201080022129.2.

Second Chinese Office Action dated Jun. 20, 2014 for related Chinese Application No. 201080022129.2.

Third Chinese Office Action dated Dec. 8, 2014 for related Chinese Application No. 201080022129.2.

WAND ATTACHMENTS FOR HAND-HELD ELECTRIC BLENDERS

FIELD OF THE INVENTION

This invention relates to wand-like attachments for hand-held electric blenders, commonly referred to as "hand blenders".

BACKGROUND OF THE INVENTION

Typically, hand blenders are versatile appliances, capable of supporting and driving various attachments and/or accessories designed to perform various tasks, such as whisking, blending or chopping, for example. In general, these attachments and accessories (generically referred to hereinafter for convenience as "tools") are selectively attachable to (and removable from) a somewhat tubular main body part which houses an electric motor; this main body part being shaped and configured to be comfortably held in the hand of a user. The aforementioned tools tend to be generally tubular and elongate; indeed, wand-like, hence the expression which is often used to describe them. The tools, when selected for use, are attached end-wise to the main body part, so as to extend along the axis of the drive shaft of the electric motor, and each tool carries, at its end remote from the main body part, a respective processing head, containing blades or other devices, designed to cut, chop, comminute or otherwise process foodstuffs when the blade (or other device) is driven in rotation by the electric motor.

The speed at which the blade or other device of a given tool is driven will depend upon the function it is intended to perform. Thus some blades or other devices are driven at the full motor speed (typically 15,000 revolutions per minute ("rpm") or thereabouts), whilst others are operated at lower speeds and thus require gearing. Lower speed operation may be required, for example, to provide additional operating torque for some functions and/or to reduce a risk of over-processing.

Where gearing is provided, it is preferable, though not essential, to incorporate it into the shaft of the tool, since the correct gearing is then certain to be in place when the tool is used. Alternatively, gearing may be provided in the motor housing, together with manually operable means to select the gearing appropriate to a chosen tool, or a separate gearbox may be provided, designed to be mounted between, and coaxially with, the tubular motor housing and the generally tubular tool.

Hand blenders are established, useful and versatile tools and at least those made by reputable manufacturers also conform to stringent safety requirements, designed to avoid user injuries through contact with the fast-rotating blades and the like. However, problems have been experienced when utilising existing tools in that:

(a) significant power levels may be required to effect certain processes;

(b) splashing or ejection of processed foodstuffs can occur during operation;

(c) strong vortices can be generated which tend to suck the blender tool down onto a receptacle in which the foodstuffs are being processed; and (d) incomplete or protracted processing occurs because the foodstuff is not efficiently operated upon by the blade or other device.

SUMMARY OF THE INVENTION

The invention seeks to address one or more of the above-mentioned problems.

According to the invention there is provided a wand-like tool for a hand blender; the tool comprising an elongate housing containing a rotatable drive shaft; the tool being adapted at one end for coupling said shaft to a motor-driven drive outlet and having a foodstuff-processing head at its other end; the processing head comprising a bladed member coupled to said shaft and mounted for rotation within a housing that is open at its end remote from the said drive shaft; wherein the bladed member comprises at least three blades having respective tips and following, on rotation, respective and differing cutting paths within said housing, and wherein an internal surface of said housing bears a plurality of spaced-apart protrusions facing the tips of said blades; each protrusion being configured to present a bluff body to foodstuffs moving relative thereto.

The provision of the bluff-body protrusions (i.e. protrusions which present a steep, non-streamlined surface to flowing material) is beneficial in disturbing laminar flow and creating turbulence, thereby significantly reducing the strength of a vortex which tends to be generated within the housing during use of the tool. Such vortices can otherwise be sufficiently powerful as to cause the tool to be sucked down into the ingredients, thus rendering usage of the tool difficult, and reducing the efficiency of the blending operation.

It is believed that the significant vortex reduction attributable to the bluff-body protrusions occurs because they create turbulence which repeatedly moves ingredients being blended into the region at which the vortex is attempting to establish.

In preferred embodiments of the invention, the bladed member comprises three blades (hereinafter referred to as a "tri-blade") and, in particularly preferred embodiments, each of the blades conforms to a curve which is convex in the direction of rotation. Such blade configurations are beneficial in reducing the torque required to move the blades through the ingredients to be blended.

It is further preferred, in a tri-blade arrangement, that one of the blades is intended to be disposed substantially horizontally in use and the other two blades are upwardly angled at differing angles; for example at 10 degrees and 20 degrees respectively from the horizontal. Such configurations further reduce the driving torque requirements, and additionally ensure efficient interaction of the blade assembly with the ingredients.

The substantially cylindrical housing of the processing head is typically formed with a roof member, surrounding and extending outwardly from said drive shaft, and, in further preferred embodiments of the invention, the cylindrical housing of the processing head is formed with a tubular side-wall, attached at its top to said roof and open at its lower end; the open end of the side-wall being castellated to provide, inter alia, a series of paths through which ingredients can enter and escape, particularly when the tool is disposed adjacent the floor of a receptacle in which the ingredients are being blended.

Preferably, though not necessarily, the bluff-body protrusions are provided only within the non-castellated part of the housing; i.e. they extend from near the roof of the housing downwardly no further than the tops of the castellations.

It is generally preferred that both the protrusions and the castellations are symmetrically distributed around said side-wall, though there is no need for any direct correlation between the angular locations of the protrusions and those of the castellations. In one preferred example, however, twelve protrusions and six castellation slots were used, with one protrusion being provided at or near the centre of each castellation slot and each intervening land.

The castellations are preferably formed as downwardly-open slots in the side-wall, and are preferably (though not necessarily) all of the same width. Usually, these slots are relatively shallow; typically extending upwardly along the side-wall for a distance in the order of one third or less of the overall height of the side-wall. In one example, six slots were provided, distributed evenly in angle around a tubular side-wall of 60 mm inside diameter; each slot subtending an angle of around 30 degrees at the drive shaft axis. The lands between the slots subtended, in said example, the same angle at the drive shaft axis, but other relationships can be used if preferred.

In the foregoing example, the protrusions extended inwardly from the internal surface of the side-wall by 2.5 mm, and the maximum blade diameter was chosen to determine a blade tip to protrusion separation of 1 mm for the horizontal blade. It will be appreciated that any blades that are bent out of the horizontal plane will, if they are nominally of the same length as the horizontal blade, have slightly different separations from the protrusions.

It will further be appreciated that other blade-to-protrusion separations can be used if desired, especially if significant changes are made to the overall dimensions of the tool housing. In one example, a significantly larger diameter housing utilised a blade-to-protrusion separation of 15.5 mm.

In some preferred embodiments of the invention, the protrusions are all of the same height, measured along the aforementioned side-wall, but in other embodiments the protrusions vary in height, either in accordance with a regular scheme or in a pseudo-random manner.

In most embodiments of the invention, the protrusions all extend inwardly from the side-wall to a similar extent, but this need not be the case, and protrusions of differing thickness can be used if preferred. It is preferred however that all individual protrusions, whatever their individual thickness, exhibit a substantially constant thickness throughout their entire height.

In general, it is preferred that angularly symmetrical arrangements of protrusions and castellations are used, as otherwise the forces generated may become unbalanced, which can result in undesirable erratic motions of the tool.

In order to facilitate fabrication of the relatively complex inner surface of the processing head, it is preferred to make the processing head of plastics material, thereby to permit the protrusions and the castellations to be formed by moulding. It is, however, preferred to form the elongate tubular shaft of the wand from stainless steel. Under these circumstances, there is cosmetic benefit in providing a frusto-conical stainless steel dome to overlay the upper part of the plastic processing head; the inner diameter of the dome being attached to the shaft and the outer diameter of the dome being sealed to the outer periphery of the processing head.

The invention also encompasses a hand blender incorporating a wand-like tool of any of the foregoing kinds.

BRIEF DESCRIPTION OF THE DRAWINGS

In order that the invention may be clearly understood and readily carried into effect, one embodiment thereof will now be described, by way of example only, with reference to the accompanying drawings, of which.

DETAILED DESCRIPTION OF THE INVENTION

Figure 1A:
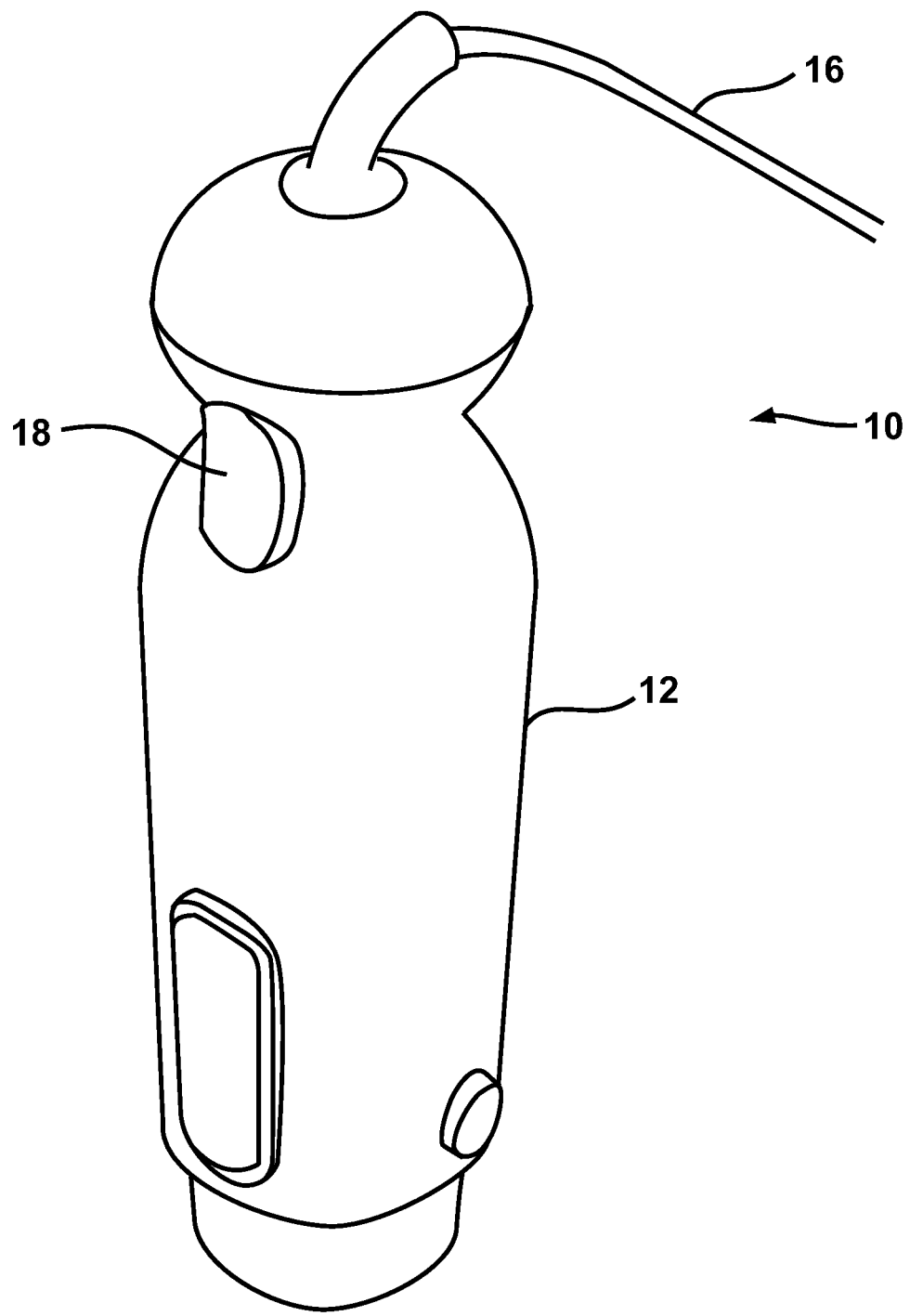
FIGS. 1(a) and 1(b) show, in side elevation and underside plan views respectively, a typical main body part of a hand blender, housing an electric motor, to which a wand-like tool of the invention may be coupled.
Figure 1B:
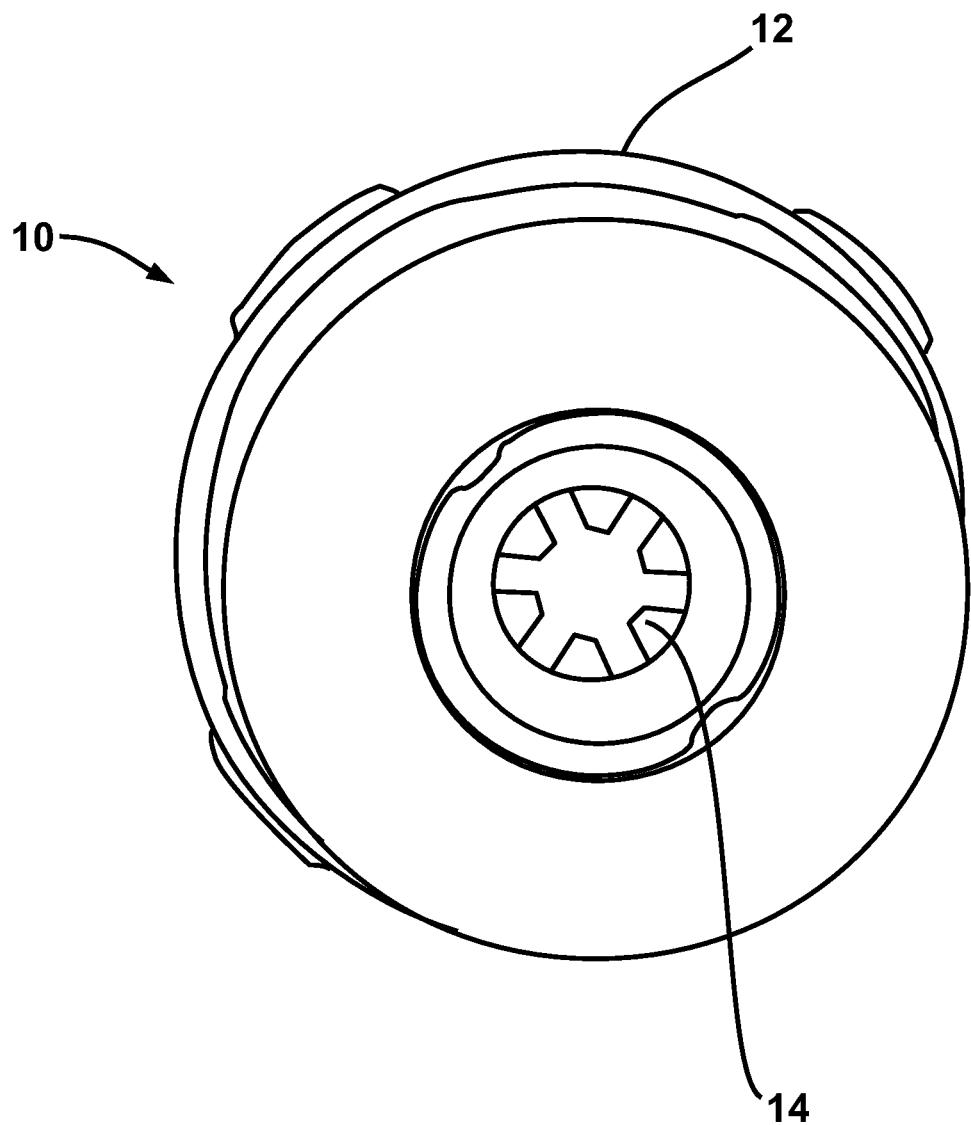

Referring now to FIGS. 1(a) and 1(b), a main body part 10 of a hand blender comprises a generally tubular casing 12 which houses an electric motor (not shown) mounted axially within the casing 12 and configured to drive an in-line output shaft 14 which is also disposed axially of the casing 12. The casing 12 carries a mains lead 16 which is connected to the motor and can be connected to a suitable power supply to energise the motor for use.

The casing 12 also supports at least one control switch, exemplified in this case by a button 18, which is actuated by a user to switch the motor on and off and, in some instances, to change the motor speed and/or to cause pulsed or continuous operation of the motor. It will be appreciated that different controls and differing numbers of controls may be provided, depending upon factors such as aesthetic design considerations, the range of functionalities offered by the appliance and/or the price point at which the appliance is aimed.

The main body part is provided with a latching arrangement (not shown) of any convenient kind, such as a bayonet fixture or a snap-fitting, for securely latching thereto wand-like tools whilst they are temporarily coupled to the motor output shaft 14 for use.

Figure 2:
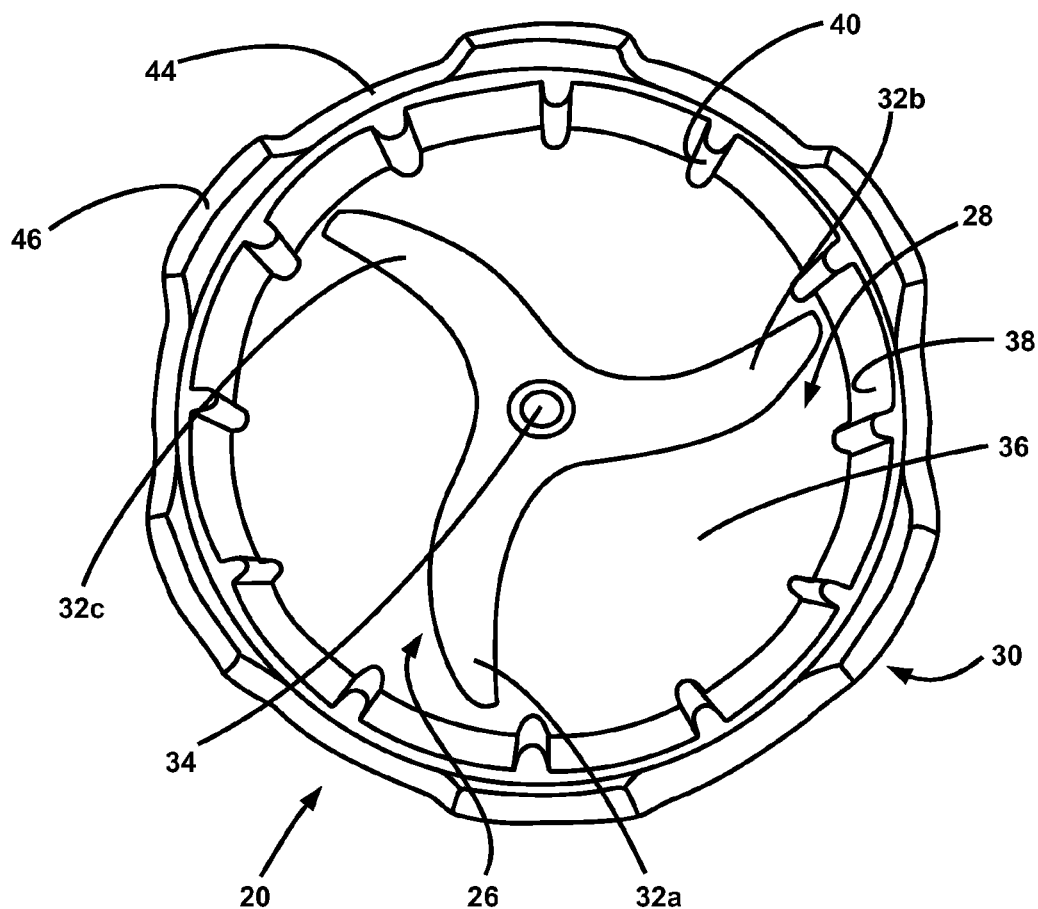
FIG. 2 shows an underside plan view of the working head of the tool in accordance with one embodiment of the invention.
Figure 3:
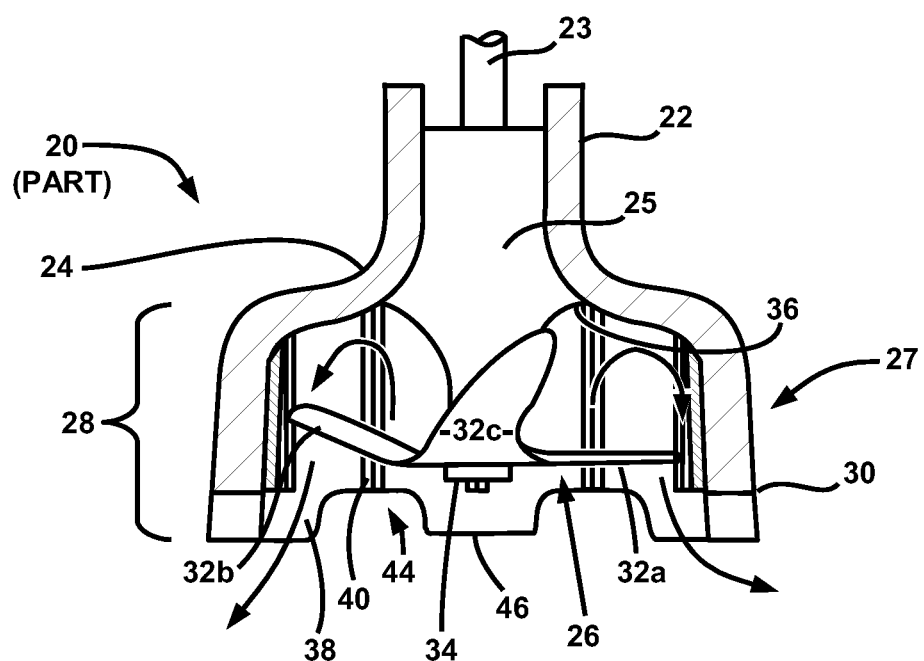
FIG. 3 shows a partial cross-section through a tool of the kind shown in FIG. 2.

Referring now additionally to FIGS. 2 and 3, a wand-like tool 20 in accordance with one embodiment of the invention comprises an elongate tube 22 containing a drive shaft 23 which extends axially therethrough and can rotate in bearings such as 25 carried within the tube. The drive shaft 23 is adapted at one end to couple to the main body part, such as 10 (see FIGS. 1a and 1b), of a hand blender and is configured to engage with the motor-driven shaft 14 of the main body part. To this end, the tube 22 and the main body part 10 are provided with co-operative elements of a suitable coupling, such as a bayonet fixture or a snap fixing, which permits the wand-like tool 20 to be temporarily attached to the main body part, with the drive shaft 23 of the tool in driving engagement with the output shaft 14, when the hand blender is to be used with the tool 20.

The tube 22 of the tool 20 carries, at its end 24 remote from the main body part 10, a blade member 26 disposed within an open-ended housing 27 defining a tubular head cavity 28 and incorporating a tubular, castellated side-wall 30, which will be described in more detail hereinafter.

The housing 27, defining head cavity 28, provides a substantially cylindrical housing or shroud within which the blade member 26 can rotate; the housing 27 being open at its end remote from the tube 22 containing the drive shaft 23.

The blade member 26 comprises, in this example, three blades 32a, 32b and 32c, each conforming to a curve which is convex in the direction of rotation (clockwise in FIGS. 2 and 3). Such blade configurations are beneficial in reducing the torque required to move the blades through the ingredients to be blended. The blades 32 are, in this embodiment of the invention, disposed at differing angles so that, when rotated, they follow different cutting paths through ingredients to be blended; the arrangement in this example being that the blade 32a is disposed substantially horizontally in use (i.e. it extends substantially perpendicular to the axis of the drive shaft 23, which is connected at 34 to the blade member 26) whereas the blades 32b and 32c are angled at 10 degrees and 20 degrees respectively upwards relative to the blade 32a (i.e. towards a roof 36 of the head cavity 28). It will be understood, however, that blade angles other than 10 degrees and 20 degrees can be used if desired.

The internal surface 38 of the tubular side-wall 30 bounding the lateral extent of the head cavity 28 bears inward protrusions, such as 40, facing the tips of the blades 32. The protrusions such as 40 are shaped to create bluff-body interaction with ingredients flowing past them as a result of the operation of the blades 32a, 32b and 32c, thereby disturbing the laminar flow that tends to occur, and creating instead a turbulent flow pattern which significantly reduces the strength of a vortex that otherwise tends to be generated within the head cavity 28 during use of the tool 20, and which can be sufficiently powerful as to cause the tool to be sucked strongly down into the ingredients and, in particular, towards the base of a container or receptacle (not shown) in which ingredients are being blended. The turbulence created by the bluff body characteristics of the protrusions such as 40 is thought to repeatedly move ingredients being blended into a region at which the vortex is attempting to establish.

As previously mentioned, the housing 27 that defines the substantially cylindrical processing head cavity 28 is formed with a roof 36, extending outwardly from the tube 22.

It will be appreciated that the aforementioned castellations in the tubular side-wall 30 provide, inter alia, a series of paths through which ingredients can enter and escape, particularly when the tool 20 is disposed adjacent the floor of a receptacle in which the ingredients are being blended.

In the present example, there are twelve protrusions such as 40, which are all substantially identical in thickness and height, and are distributed equi-angularly around the upper part of the housing 27 defining the head cavity 28. On the other hand, there are, in this example, six castellations, each of which comprises a slot, such as 44, of rectangular profile. The slots are symmetrically distributed around the side-wall 30, and separated by intervening land areas such as 46.

The slot portions 44 of the castellations in the open end of the tubular wall 30 are preferably all of the same width and relatively shallow, extending upwardly along the side-wall 30 for a distance in the order of one third or less of the overall height of the side-wall 30 from its open edge to the roof 36. In this example, the six slots such as 44 are distributed evenly in angle around a side-wall 30 which typically has an inside diameter of 60 mm; each slot subtending an angle of around 30 degrees at the drive shaft axis. The lands such as 46 between the castellation slots 44 subtend, in this example, the same angle at the drive shaft axis passing through connection 34, but other relationships can be used if preferred. There is no need for the employment of any particular angular relationship between the protrusions 40 and the castellation slots 44, though it is preferred that angular symmetry is preserved. In this particular example, there is a protrusion 40 aligned with the centre of each castellation slot 44 and each intervening land 46.

In this example, the protrusions 40 do not extend into the region of the head cavity 28 occupied by the castellations 44, 46; i.e. they are provided only where the side-wall 30 is continuous. In other examples of the invention, however, some at least of the protrusions extend into the castellated region of the side wall 30.

In the present example, each of the protrusions such as 40 extends inwardly from the internal surface 38 of the side-wall 30 by 2.5 mm, and the dimensions of the blade member 26 are chosen to create a preferred blade tip to protrusion separation of 1 mm for the blade 32a. As mentioned previously, the separation will be somewhat greater for the blades 32b and 32c. These dimensions are not critical, however, and useful performance can be achieved with other dimensions. For housing diameters significantly larger than 60 mm, for example those used for tools commensurate in size with small frying pans or the like, blade tip to protrusion separations up to 15.5 mm can be employed.

Various changes in the parameters described in the particular example above may be made without departing from the scope of the invention. In particular, it will be appreciated that, whilst the above-described example used six castellation slots and twelve internal protrusions, there is no need for a direct correlation between the number of slots and the number of protrusions, or in the positioning of the slots in relation to the protrusions.

For example, in another embodiment of the invention giving acceptable performance, sixteen protrusions were provided. Moreover, any convenient number of castellation slots may be used if preferred and clearly, if the overall diameter of the processor head is changed, different numbers of castellation slots and/or protrusions may be preferred.

Furthermore, it will be appreciated that the protrusions such as 40 need not all be of the same height, or extend inwardly from the sidewall by the same amount, and moreover their surfaces facing the blades may be shaped differently from one another. It is preferred, however, that each individual protrusion is of substantially constant inward extent throughout its height. It is also preferred that angularly symmetric configurations are employed, since otherwise out-of-balance forces may be generated which could result in erratic movements of the tool.

Figure 4:
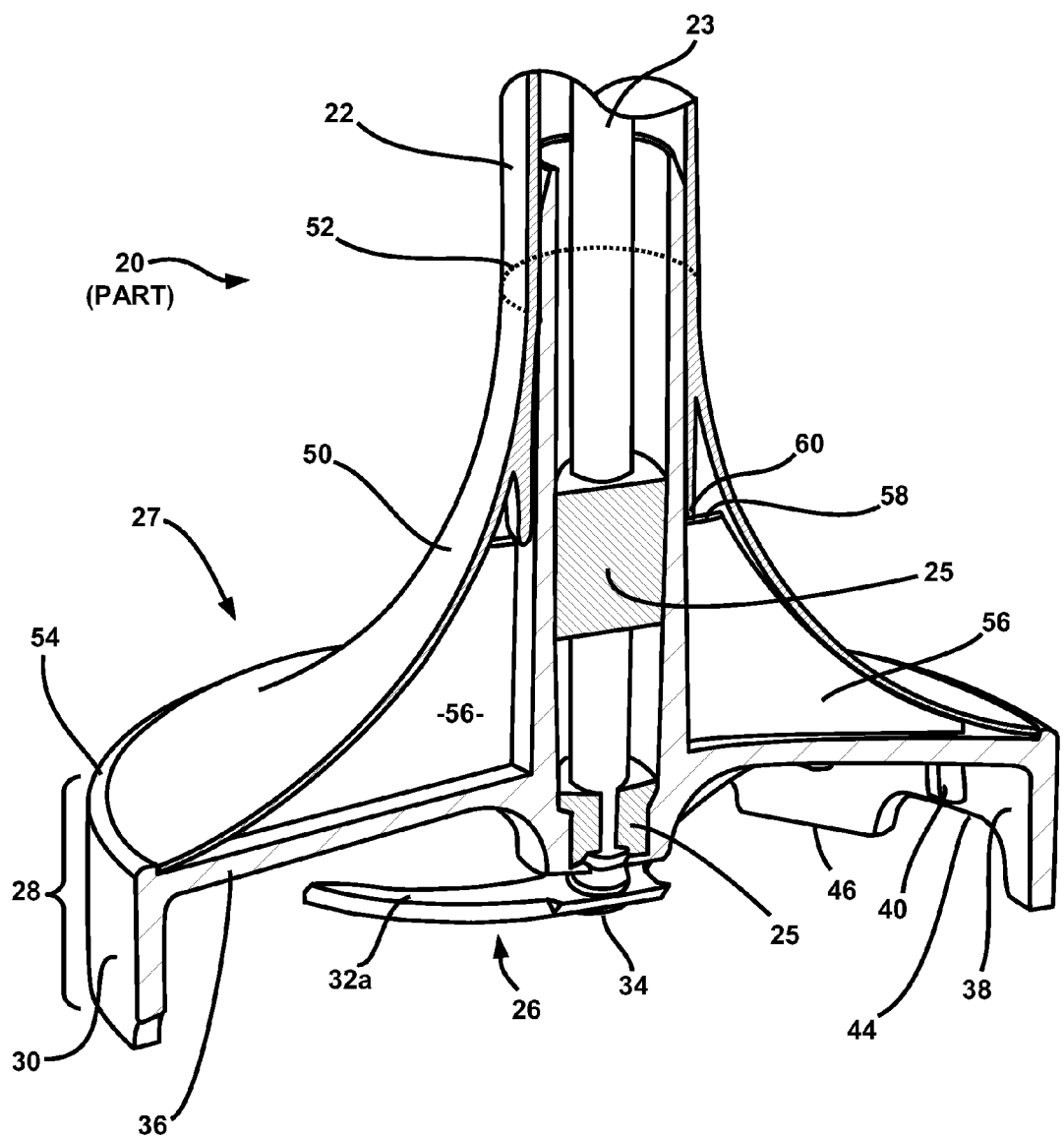
FIG. 4 shows a partial cross-section through a tool formed with a stainless steel shaft and a plastic processing head, and having a stainless steel dome to cosmetically cover a region between the shaft and the processing head.

In order to facilitate fabrication of the relatively complex inner surface of the housing 27 that defines the head cavity 28, it is preferred to make the housing of plastics material, thereby to permit the protrusions such as 40 and the castellations 44, 46 to be formed by moulding. It is, however, preferred to form the elongate tubular shaft 22 of the wand 20 from stainless steel. Under these circumstances, there is cosmetic benefit in providing, as shown in FIG. 4, a somewhat frusto-conical stainless steel dome 50 to overlay the roof 36 forming the upper part of the plastic housing 27 and/or the junction between the stainless steel and plastic component parts 22 and 27. In this example, the upper part (inner diameter) of the dome 50 is attached to the shaft 22 by welding, as indicated at 52; the welded joint being polished to present a smooth junction between the shaft 22 and the dome 50. The lower extremity (outer diameter) of the dome 50 is sealed, as indicated at 54, to the outer periphery of the roof 36 of the housing 27. This arrangement is considered to provide, for some embodiments at least, a more pleasing appearance than would be presented by the simple attachment of a plastics housing to a stainless steel shaft. In other embodiments, the dome 50 may be extended downwards, so as to wrap over part or all of the wall 30. As a further alternative, the top of the roof 36 may be provided with a short upstanding circular wall, just inboard of its periphery, and the dome 50 may be configured to encircle and seal against the outside of that short wall and to abut the top of the roof 36 with its external surface in line with the external wall 30 of the plastic housing 27.

In this embodiment of the invention, the plastic housing 27 is moulded to provide a plurality of suitably shaped upstanding ribs, such as that shown at 56, to support the dome 50; it being understood that the dome is made of relatively thin material as it has only a cosmetic function. The ribs such as 56 are conveniently formed with radially-directed shoulder portions such as 58, used to locate the plastic housing 27 against the open end 60 of the tubular shaft housing 22. The plastic housing 27 may, however, be located relative to the tubular, metallic shaft housing 22 in any convenient manner, and moreover the two components may be secured together in any convenient way, such as by compressive fitting, and/or by means of interlocking or snap-fitted components and/or by adhesive.

The invention also encompasses a hand blender incorporating a wand-like tool as described hereinbefore.

The invention claimed is:

1. A wand-like tool for a hand blender, the tool comprising an elongate housing containing a rotatable drive shaft; the tool being adapted at one end for coupling said shaft to a motor-driven drive outlet and having a foodstuff-processing head at its other end; the processing head comprising a bladed member coupled to said shaft and mounted for rotation within a processing head housing formed with a roof member and an opposed open end, a side-wall extending from said roof member to said opposed open end; wherein the bladed member comprises at least three blades having respective tips and following, on rotation, respective and differing cutting paths within said housing, wherein the open end of the side-wall is castellated and bears protrusions laterally protruding toward and facing the tips of said blades; each protrusion presenting a respective bluff body to foodstuffs moving relative thereto; and wherein the at least three blades includes a first blade upwardly angled at a first blade angle, a second blade upwardly angled at a second blade angle different than the first blade angle, and a third blade extending horizontal such that the blades have different separations from the protrusions.

2. The tool according to claim 1, wherein the bladed member comprises three blades.

3. The tool according to claim 2, wherein each of the blades conforms to a curve which is convex in the direction of rotation.

4. The tool according to claim 2, wherein the first blade angle is 10 degrees and the second blade angle is 20 degrees.

5. The tool according to claim 1, wherein the processing head housing is substantially cylindrical.

6. The tool according to claim 5, wherein the protrusions are formed only in non-castellated regions of said side-wall.

7. The tool according to claim 5, wherein the castellations are symmetrically distributed around an inner surface of said side-wall.

8. The tool according to claim 5, wherein the castellations comprise slots in the side-wall with lands therebetween; the slots all having substantially the same width.

9. The tool according to claim 8, wherein said slots are relatively shallow, extending upwardly along the side-wall for a distance in the order of one third or less of the overall height of the side-wall.

10. The tool according to claim 9 further comprising six castellation slots distributed evenly around a side-wall of about 60 mm inside diameter; each slot subtending an angle of around 30 degrees at the axis of the drive shaft.

11. The tool according to claim 10, wherein the lands between the slots all subtend the same angle at the axis of the drive shaft.

12. The tool, according to claim 10, wherein the protrusions each extend inwardly from the internal surface of the side-wall by substantially the same distance.

13. The tool according to claim 12, wherein said distance is approximately 2.5 mm, and the blade diameter is chosen to determine a blade tip to protrusion separation of around 1 mm.

14. The tool according to claim 1, wherein the elongate housing is a tubular, metallic shaft housing and wherein the processing head housing is made of plastics material, thereby to permit the protrusions and the castellations to be formed by moulding.

15. A hand blender incorporating a wand-like tool according to claim 1.

16. A wand-like tool for a hand blender, the tool comprising an elongate tubular metallic shaft housing containing a rotatable drive shaft; the tool being adapted at one end for coupling said shaft to a motor-driven drive outlet and having a foodstuff-processing head at its other end; the processing head comprising a bladed member coupled to said shaft and mounted for rotation within a housing formed with a roof member and an opposed open end;
  wherein the bladed member comprises at least three blades having respective tips and following, on rotation, respective and differing cutting paths within said housing;
  wherein an internal surface of said housing bears protrusions facing the tips of said blades; each protrusion presenting a respective bluff body to foodstuffs moving relative thereto.
  wherein the housing is made of plastics material, thereby to permit the protrusions and the castellations to be formed by moulding;
  wherein the tubular shaft is formed from stainless steel;
  wherein there is provided a stainless steel dome to overlay the roof member of the plastic housing and/or the junction between the stainless steel and plastic component parts; and
  wherein the at least three blades includes a first blade upwardly angled at a first blade angle, a second blade upwardly angled at a second blade angle different than the first blade angle, and a third blade extending horizontal such that the blades have different separations from the protrusions.

17. The tool according to claim 16, wherein an upper part of the dome is attached by welding to the tubular shaft; the welded joint being polished to present a smooth junction between the shaft and the dome.

18. The tool according to claim 16, wherein a lower extremity of the dome is sealed to the outer periphery of the roof of the housing.

19. The tool according to claim 16, wherein the dome is configured to wrap over part at least of a side-wall extending from the roof member of said housing.

20. A hand blender incorporating a wand-like tool according to claim 16.

* * * * *